United States Patent [19]
Iba et al.

[11] Patent Number: 5,968,291
[45] Date of Patent: Oct. 19, 1999

[54] HYDROGEN-ABSORBING ALLOY

[75] Inventors: Hideki Iba, Toyota; Etsuo Akiba, Tsukuba, both of Japan

[73] Assignees: Toyota Jidosha Kabushiki Kaisha, Toyota; Director-General of Agency of Industrial Science and Technology, Tokyo, both of Japan

[21] Appl. No.: 08/679,304

[22] Filed: Jul. 12, 1996

[30] Foreign Application Priority Data

Jul. 13, 1995 [JP] Japan .................................... 7-199250

[51] Int. Cl.⁶ ................................................. C22C 14/00
[52] U.S. Cl. ........................ 148/421; 148/671; 420/417; 420/900; 429/218; 429/224
[58] Field of Search .................... 420/900, 417, 420/421, 424, 435, 580; 148/421, 422, 424, 671; 429/218, 224

[56] References Cited

U.S. PATENT DOCUMENTS

| | | | |
|---|---|---|---|
| 4,111,689 | 9/1978 | Liu ........................................ | 420/900 |
| 4,195,989 | 4/1980 | Gamo et al. ............................ | 420/900 |
| 4,623,597 | 11/1986 | Sapru et al. ............................ | 429/101 |

FOREIGN PATENT DOCUMENTS

| | | | |
|---|---|---|---|
| 53-14512 | 5/1978 | Japan . | |
| 57-152436 | 9/1982 | Japan .................................... | 420/900 |
| 59-78908 | 5/1984 | Japan . | |
| 61-41978 | 11/1984 | Japan . | |
| 6-93366 | 4/1994 | Japan . | |

OTHER PUBLICATIONS

Iba et al., "Hydrogen Absorbing Alloys With a Large Capacity for New Energy Carrier", Toyota Technical Review, vol. 45, No. 2, pp. 108–113, Nov. 1995.

"A Dictionary of Metallurgy", A.D. Merriman, p. 239, 1958.

Four–page European Search Report, EP 96 11 1293 Oct. 14, 1996.

Hydrogen absorbing alloys with a large capacity for a new energy carrier, H. Iba et al., Chemical Abstracts, vol. 125, No. 8, Aug. 19, 1996, Columbus, Ohio, abstract no. 91258, pp. 108–113.

Properties and Electrode Performances of $(Zr, A)V_{0.5}Ni_{1.1}Mn_{0.2}Fe_{0.2}$ (A=Ti, Nb and Hf) for Nickel–Hydrogen Batteries, J. Huot et al, Denki Kagaku, vol. 61, No. 12, 1993, Japan, pp. 1424–1428.

Crystal Structure of Multiphase Alloys $(Zr,Ti)(MnV)_2$, J. Huot et al, Journal of Alloys and Compounds, vol. 231, Dec. 15, 1995, pp. 84–89.

The relation between microstructure and hydrogen absorbing property in Laves phase–solid solution multiphase alloys, H. Iba, E. Akiba, Journal of Alloys and Compounds, vol. 231, No. 1, Dec. 15, 1995, pp. 508–512.

Hydrogen absorption properties of Ti–Cr–A (A=V, Mo or other transition metal) B.C.C. solid solution alloys, T. Kabutomori et al, Journal of Alloys and Compounds, vol. 231, No. 1, Dec. 15, 1995, pp. 528–532.

(List continued on next page.)

*Primary Examiner*—John Sheehan
*Attorney, Agent, or Firm*—Burns, Doane, Swecker & Mathis, L.L.P.

[57] ABSTRACT

This invention relates to a hydrogen-absorbing alloy, and particularly provides a hydrogen-absorbing alloy having a body-centered cubic structure which has a periodical structure formed by spinodal decomposition, has a large hydrogen storage amount, has excellent hydrogen desorption characteristics and can mitigate activation conditions, the alloy comprises at least two elements of alloy components, wherein the relational curve between chemical free energy of solid solutions and an alloy composition has a shape describing an upwardly convexed curve, or said alloy comprises two solid solutions having a regular periodical structure formed by spinodal decomposition within a region satisfying the relation $d^2G/dX_B^2 < 0$ (where G is chemical free energy and $X_B$ is a solute alloy concentration) as the principal phase.

10 Claims, 7 Drawing Sheets

OTHER PUBLICATIONS

Structural studies of a new Laves phase alloy (Hf,Ti)(Ni,V)$_2$ and its very stable hydride, E. Rönnebro et al, Journal of Alloys and Compounds, vol. 231, No. 1, Dec. 15, 1995, pp. 90–94.

Microstructures of hydrogen absorbing Zr$_{0.5}$Ti$_{0.5}$MnV multiphase alloys, H. Iba et al, Journal of the Japan Institute of Metals, Apr. 1995, vol. 59, No. 4, ISSN 0021–4876, pp. 456–462.

"Hydrogen Absorption and Microstructure in BCC Alloys with C14–Type Laves Phase", J. Japan Inst. Metals, vol. 58, No. 10, pp. 1225–1232, 1994.

"Microstructures of Hydrogen Absorbing Zr$_{0.5}$Ti$_{0.5}$MnV Multiphase Alloys", J. Japan Inst. Metals, vol. 59, No. 4, pp. 456–462, 1995.

50nm

HYDROGEN-ABSORBING ALLOY

BACKGROUND OF THE INVENTION

1. Field of the Invention

This invention relates to a hydrogen-absorbing alloy. More particularly, this invention relates to a hydrogen-absorbing alloy having a body-centered cubic lattice structure which has a periodical structure generated by spinodal decomposition, has a large hydrogen storage capacity, has excellent hydrogen desorption characteristics and can mitigate an activation condition.

2. Description of the Prior Art

Solar energy, atomic power, wind power, geothermal heat, re-utilization of waste heat, etc, have been proposed as new energy sources to replace fossil fuel from the aspect of the environmental problems of the earth. In any of these cases, the common problem is how to store and transport energy. A system which electrolyzes water by using solar energy or water power and uses the resulting hydrogen as an energy medium can be said to provide ultimate clean energy in the sense that the starting material is water and the product obtained by consuming this energy is water, too.

As one of the means for storing and transporting this hydrogen, a hydrogen-absorbing alloy can absorb and store a hydrogen gas to a capacity about 1,000 times the volume of the alloy itself, and its volume density is substantially equal to, or greater than, that of liquid or solid hydrogen. It has long been known that metals and alloys having a body-centered cubic lattice structure (hereinafter called the "BCC structure"), such as V, Nb, Ta, Ti—V alloys, etc, absorb and store greater amounts of hydrogen than an $AB_5$ type alloy such as $LaNi_5$ and an $AB_2$ type alloy such as $TiMn_2$ that have been already put into practical application. This is because the number of hydrogen absorbing sites in the crystal lattice is large in the BCC structure, and the hydrogen absorbing capacity according to calculation is as great as H/M=2.0 (about 4.0 wt % in alloys of Ti or V having an atomic weight of about 50).

A pure vanadium alloy absorbs and stores about 4.0 wt %, which is substantially similar to the value calculated from the crystal structure, and desorbs about half this amount at normal pressure and room temperature. It is known that Nb and Ta as the elements of the same Group 5A of the Periodic Table exhibit a large hydrogen storage capacity and excellent hydrogen desorption characteristics in the same way as vanadium.

Because pure V, Nb, Ta, etc, are extremely high in cost, however, the use of these elements is not realistic in industrial applications which require a considerable amount of the alloys such as a hydrogen tank or a Ni—MH cell. Therefore, properties of alloys have been examined within the range having a BCC structure such as Ti—V, but new problems have arisen in that these BCC alloys merely absorb and store hydrogen at a practical temperature and pressure but that their hydrogen desorption amount is small, in addition to the problems encountered in V, Nb and Ta in that the reaction rate is low and activating is difficult. As a result, alloys having a BCC phase as the principal constituent phase have not yet been put into practical application.

The conventional attempt to control the characteristics by alloying has been carried out by component design in all of the $AB_5$ type, the $AB_2$ type and the BCC type. However, the set range of the component does not exceed the category of the intermetallic compound single-phase and the BCC solid solution single-phase in all of these examples. Japanese Unexamined Patent Publication (Kokai) No. 59-78908 is an example of the prior art references in this field. As a method of producing a body-centered cubic lattice type alloy composition and its hydrides at room temperature, this reference discloses a method of producing metal hydrides which comprises reacting (a) a body-centered cubic system structure containing titanium and a second metal selected from the group consisting of molybdenum, vanadium and niobium, (b) a solid solution alloy containing at least about 1 atm % of a third metal selected from the group consisting of aluminum, cobalt, chromium, copper, manganese, nickel, iron, gallium, germanium, silicon and mixtures thereof under the state where the third metal is dissolved in the body-centered cubic structure system, when the second metal is vanadium or niobium or, whenever desired, when the second metal is molybdenum, and a hydrogen gas at a temperature of from about 0 to about 100° C., whereby the reaction rate between the solid solution and hydrogen at this temperature is at least about 10 times the reaction rate between non-alloy titanium and hydrogen at this temperature and at an equal hydrogen pressure.

However, this prior art reference does not describe the case other than the solid solution single-phase at all, although the two-phase region exists in Ti—V and Ti—V—Fe systems in the case of the alloys having the BCC structure. Further, although the technology of this reference can mitigate the reaction rate and the activation condition, it cannot improve the desorption characteristics per se, that is, the mitigation of the desorption temperature and the pressure condition.

Several attempts have been made recently to obtain multi-phase alloys. For example, Japanese Examined Patent Publication (Kokoku) No. 4-80512 (corresponding to U.S. Pat. No. 4,623,597) discloses an extremely broad concept including the single-phase and the multi-phase without specifying the crystal structures of the alloy phase. Though the patents and the researches of the hydrogen-absorbing alloys have been limited in the past to the category of the single-phase intermetallic compounds, this prior art reference describes the technology for controlling the optimum structures such as the combination of the multi-phases and the structures that can fully exploit the effects as the hydrogen-absorbing alloys, though the reference does not define the combinations of the phases, the structures and the components that give concrete effects. The Examples of the reference disclose multi-phase alloys having a crystallographically random structure originating from an amorphous phase, for quenched films.

Further, other prior art references include research papers ("Science", Vol. 260 (1993), pp. 176; "Electrical Steel Making", Vol. 66 (1995), pp. 123), and so forth. These references describe the deviation of the components from the stoichiometric composition of a Laves phase as an intermetallic compound in the $AB_2$ alloy and the second phase that appears due to the addition of the third and fourth elements. However, these papers describe that the Laves phase as the principal phase exhibits the fundamental effects as the hydrogen-absorbing alloy, that is, the hydrogen-absorbing capacity, the hydrogen desorption temperature, the equilibrium pressure, etc, while the second phase is small in amount and is limited to the accompanying effects such as a mitigation of the activation condition, an improvement in durability, and so forth. As described above, the multi-phase technology according to the prior art has not yet succeeded in accomplishing a drastic increase of the hydrogen absorbing capacity and the mitigation of the absorption and desorption condition. The development of the technology capable of further improving these characteristics has therefore been desired.

SUMMARY OF THE INVENTION

The present invention examines hydrogen-absorbing alloys from the following points, and aims at providing a revolutionary high-capacity alloy which can be effectively utilized as an energy carrier.

(1) To obtain a hydrogen absorbing capacity greater than the linear combination of each end member phase by exploiting to the maximum the interaction of the interface or between the phases.

(2) To accomplish novel components and a novel composition, that have not been found in the single-phase, from the constituent phases of the multi-phase.

It is another object of the present invention to examine optimization of the components of the hydrogen-absorbing alloy described above and the crystal structure, and to provide an alloy having a high performance hydrogen absorbing phase with specific crystal structure.

It is still another object of the present invention to provide an alloy based on a novel evaluation method by examining the structure of the hydrogen-absorbing alloy described above.

The gist of the present invention will be described as follows.

(1) A hydrogen-absorbing alloy comprising at least two elements of alloy components, wherein the relational curve between chemical free energy of solid solutions and an alloy composition has a shape describing an upwardly convex curve at a temperature not higher than a solidus line in a phase diagram of said alloy systems, or a region satisfying $d^2G/dX_B^2 < 0$; where G is chemical free energy and $X_B$ is a solute alloy concentration, and said alloy comprises two solid solutions having a regular periodical structure formed by spinodal decomposition therein as the principal phase.

(2) A hydrogen-absorbing alloy comprising the principal phase growing to a specific crystal orientation in a melting-solidification process or in a solution-aging process, and constituted by two solid solutions having a periodical structure regularly oriented with a lamella size in a nano-order of 1.0 to 100 nm.

(3) A hydrogen-absorbing alloy according to item (1) or 2, wherein each of said two solid solutions constituting the principal phase has a body-centered cubic crystal structure.

(4) A hydrogen-absorbing alloy according to any of items (1) to (3), wherein said composition is expressed by the general formula $Ti_xV_{2-x}$; where x is a molar fraction and satisfies the relation $0.5 \leq x \leq 1.5$, and the principal phase exists within the range generated by spinodal decomposition.

(5) A hydrogen-absorbing alloy according to any of items (1) to (3), wherein said composition is expressed by the general formula $Ti_xV_yMn_z$; where each of x, y and z is a molar fraction and satisfies the relation $0.1 \leq x \leq 2.5$, $0.1 \leq y \leq 2.7$, $0.01 \leq z \leq 2.5$ and $x+y+z=3.0$, and the principal phase exists within the range generated by spinodal decomposition exclusive of a C14 single-phase region; where C14 is a typical structure of the Laves phase and $MgZn_2$ type crystal structure.

(6) A hydrogen-absorbing alloy according to any of items (1) to (3), wherein said composition is expressed by the general formula $Ti_xV_yMn_zCr_{1-z}$; where each of x, y and z is a molar fraction and satisfies the relation $0.1 \leq x \leq 2.5$, $0.1 \leq y \leq 2.7$, $0.01 \leq z \leq 2.5$ and $x+y+z=3.0$, and the principal phase exists within the range generated by spinodal decomposition exclusive of a C14 single-phase region; where C14 is a typical structure of the Laves phase and $MgZn_2$ type crystal structure.

(7) A hydrogen-absorbing alloy according to any of items (1) to (6), wherein the spinodal decomposition of the principal phase or the growth of the periodical structure generated by said spinodal decomposition is attained by solution treatment for holding said alloy at 500 to 1,500° C. for 1 minute to 50 hours and if necessary, aging treatment for holding said alloy at 250 to 1,000° C. for 1 minute to 100 hours.

DETAILED DESCRIPTION OF THE PREFERRED EMBODIMENT

Figure 1:
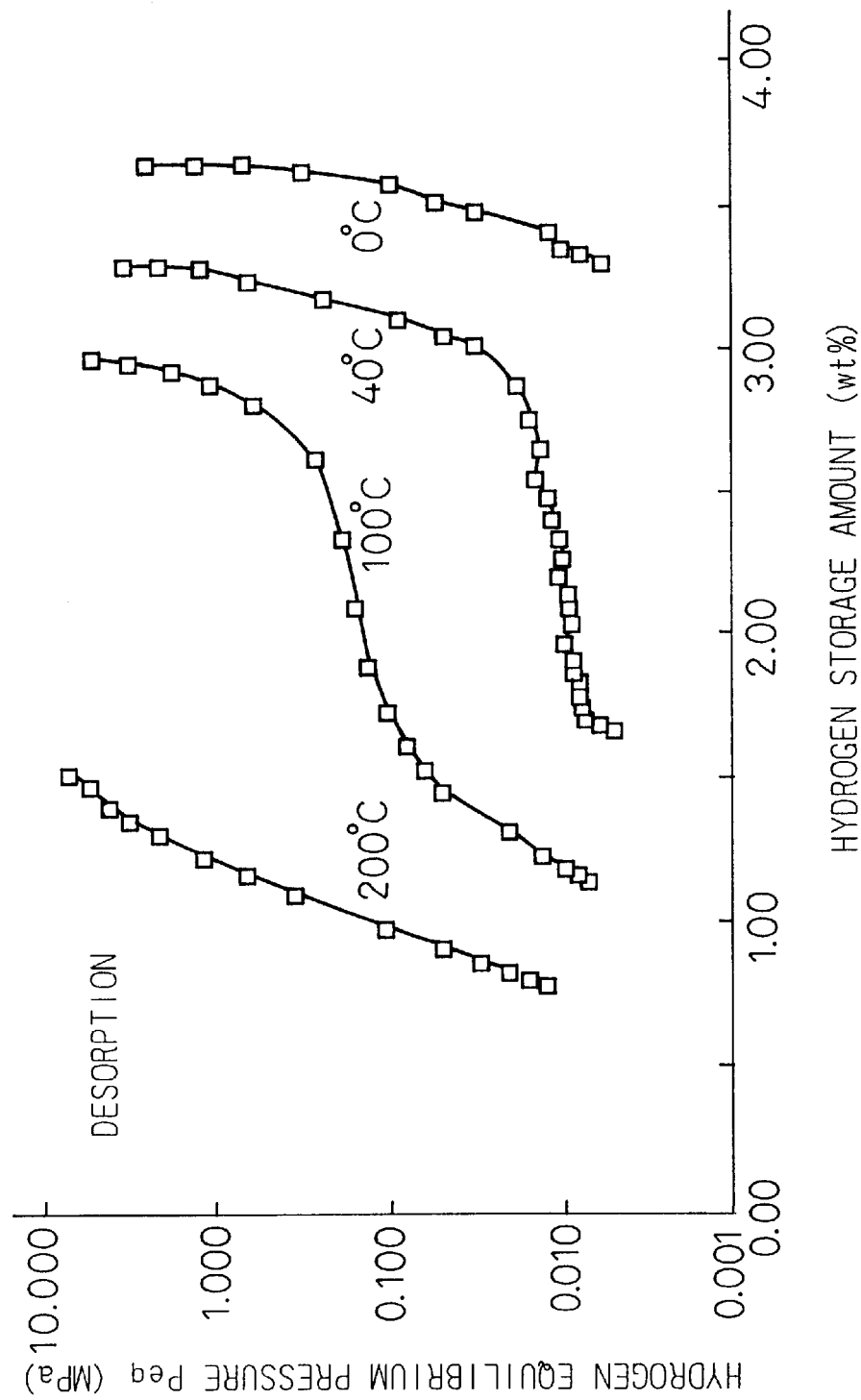
FIG. 1 is a diagram showing pressure-composition isotherm at desorption of a $Ti_{1.0}Mn_{1.0}V_{1.0}$ alloy according to Example 2 of the present invention at each temperature.

The inventors of the present invention have carried out a large number of experiments and have observed that among the BCC alloys, the hydrogen desorption characteristics can be remarkably improved in those alloys which are regularly decomposed into two very fine phases of a nano-order due to spinodal decomposition inside the alloys. In other words, in those types of alloys having a periodical structure which comprise Ti and V as the principal components thereof, whose crystal structure is BCC, and whose two phases are generated by the spinodal decomposition and are grown into a specific crystal orientation, and have mutually different lattice constants and have a periodical structure in the lamella size of 1.0 to 100 nm, the large hydrogen storage amount which the BCC metals and alloys have due to the crystal structure of this periodical nano-order structure is desorbed within a practical temperature and pressure zone, and the activation condition is mitigated, and the reaction rate can be improved. The interface of the two nano-order phases, as the first aspect of the present invention accomplished by the finding described above, speeds up the migration of the hydrogen atoms inside the alloy as a high speed diffusion path, and accomplishes an improvement in the reaction rate and ease of activation. Stability of the hydrides drops in the proximity of the boundary due to coherent strain between the two phases, and this drop in stability presumably results in the improvement in the hydrogen desorption characteristics.

In the present invention, a third phase having a different structure may exist in mixture or a phase existing in a colony form in the matrices of the different structures may be the spinodal decomposition phase so long as the spinodal decomposition phase exists as the principal phase and the two phases having this regular periodical structure primarily execute the hydrogen absorption and storage operations.

Some of the conventional Laves phase alloys are reported to contain the BCC phase, but absorption and desorption of hydrogen are merely attained by the Laves phase as the principal phase and the BCC phase portion plays the role of only improving durability by preventing the formation of fine powder.

The second aspect of the present invention stipulates the concrete requirement for the periodical structure formed by the spinodal decomposition described above. If the lamella size growing in a specific crystal orientation is outside the upper and lower limit ranges of the present invention, that is, if it is less than 1.0 nm and is greater than 100 nm, the intended hydrogen absorption and desorption characteristics as the hydrogen-absorbing alloy cannot be obtained. Therefore, the lamella size is limited to the range of the present invention.

The term "spinodal decomposition" hereby used means the process in which the phase separates into two phases having a constant amplitude from concentration fluctuation, and the structure formed by this decomposition is hereby referred to as a "modulated structure". Up to this state, the two phases are "coherent". The term "growth" hereby used means the process in which the two phases having a concentration amplitude which becomes thus constant increases the wavelength by Ostwald growth. Once this growth takes place, coherency is gradually lost and dislocation of the interface occurs.

The term "regular" is hereby used in the sense that decomposition and growth of the two phases in a specific crystal orientation at a constant wavelength corresponds to "regular arrangement". Therefore, the term is not limited to the "ordered" of the term "ordered structure" as used when the arrangement of the atoms in the crystal lattice is regular, as in the intermetallic compounds having stoichiometric compositions.

Hereinafter, the reasons for limitation will be explained in further detail with primary reference to the chemical composition of the alloy according to the present invention.

Unlike the two-phase separation of the nucleation-growth type, the spinodal decomposition according to the present invention starts from the solute concentration fluctuation inside the solid solutions. Therefore, the two phases formed by the spinodal decomposition is generally referred to as the "modulated structure" and can be controlled to from several nm to dozens of nm by the production conditions such as the components and heat-treatment. The two phases have a mutually coherent relationship, and the coherent strain occurs on the interface to the extent corresponding to the misfit of the lattice constants. The present invention utilizes this coherent strain as the factor contributing to instability of the hydrides.

Figure 5:
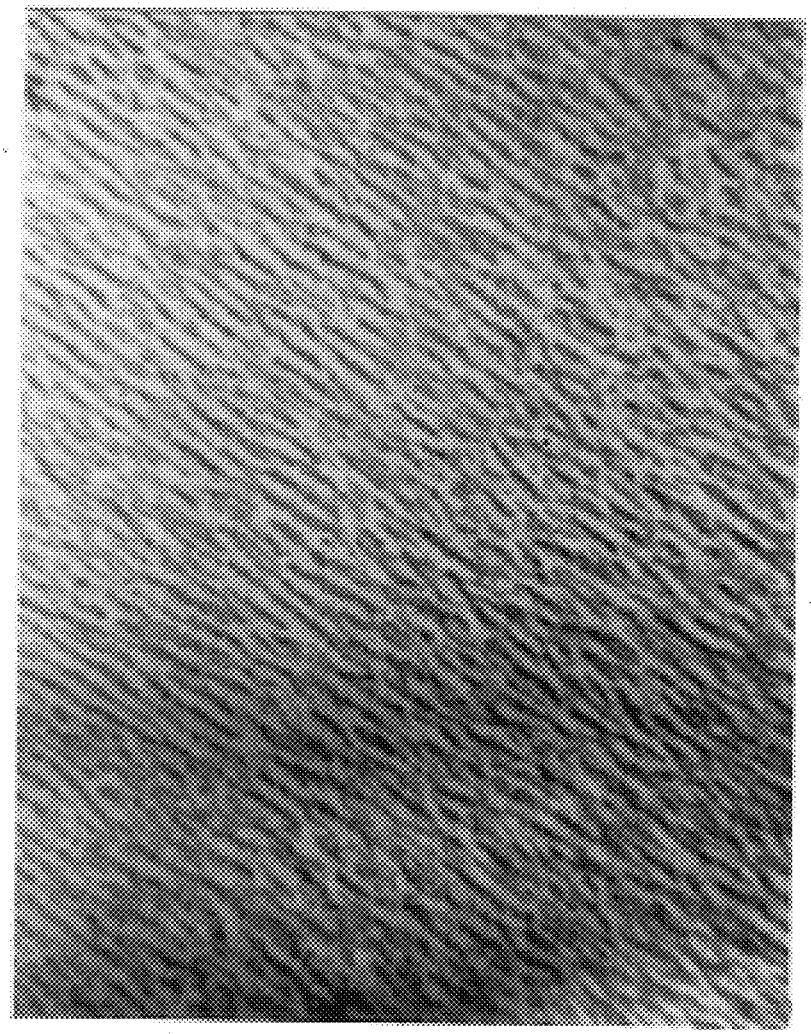
FIG. 5 is a transmission electron micrograph showing the metallic structure of the $Ti_{1.0}Mn_{1.0}V_{1.0}$ alloy according to Example 2 of the present invention.

Cu—Ni—Fe and Al—Zn are well known as alloy systems which undergo spinodal decomposition. The inventors of the present invention have confirmed the fact, from metallographical study of the hydrogen-absorbing alloys, that the typical spinodal structure is the structure observed and that the satellites can be observed due to the lattice strain of the coherent phase boundary in the electron diffraction pattern. FIG. 5 shows a transmission electron micrograph of the $Ti_{1.0}Mn_{0.9}V_{1.1}$ phase as the typical example. The present inventors have reported similar structural photographs for other alloys (for example, Journal of Japan Institute Metals, Vol. 59 (1995), pp. 458).

Further, the periodical structure formed by the spinodal decomposition in the present invention means the following three states:

(1) the state of the concentration fluctuation during the formation of the structure due to the spinodal decomposition;

(2) the state where the spinodal decomposition is completed and the concentration amplitude becomes constant; and (3) the state where the wavelength increases due to the aggregation reaction.

As can be appreciated from the fact that the electron diffraction pattern of the transmission electron microscope obtained from the selected area including the two phases shows only the pattern of one kind of BCC structure and the satellite appearing at each spot, the structure of the present invention is a periodical structure which is regularly arranged in the nano-scale in the specific crystal orientation and involves a predetermined amount of the lattice strain. Therefore, this structure is different from the disorderly state described in the claims of the afore-mentioned Japanese Examined Patent Publication (Kokoku) No. 4-80512 (U.S. Pat. No. 4,623,597).

In the Ti—V system described in claim 4, the alpha phase of the hexagonal crystal structure is formed in a low temperature zone of the binary phase diagram. Therefore, the spinodal decomposition zone is narrow, and the reaction occurs under only a specific production condition in which quenching is carried out from the decomposition zone. Though the separation of the two phases can be confirmed in the fine structure of the as-cast material of the $Ti_{1.0}V_{1.0}$ alloy, the periodical structure in the specific crystal orientation cannot be confirmed. On the other hand, in order to regularize such a structure, a thermal driving force for promoting the aggregation reaction is necessary. More concretely, heat-treatment inside the two-phase separation range, such as the one described in claim 7, is necessary.

In contrast, the spinodal decomposition range can be expanded by alloying with Mn and Cr, as described in claims 5 and 6, and the modulated structure which is more regular can be formed in even the as-cast material. FIG. 5 described above shows the case where the phase having the fine structure of the BCC phase crystallized in the colony form in the matrix of the C14 Laves phase is controlled to at least about 95% by component design. Because it is difficult to obtain the single-phase of the solid solution alloys containing multiple components, the claims stipulate that the principal phase is generated by the spinodal decomposition in the case where some quantities of third phase exist and in the case where the phase with the structure of the present invention is distributed in another matrix.

The size and regularity of the regular periodical structure grown in the specific crystal orientation can be controlled by heat-treatment, but it is the essential condition for the present invention that the separation of the two phases due to the spinodal decomposition occurs. Therefore, the component range described in claims 4 to 6 is decided by the range in which the spinodal decomposition occurs, on the basis of the findings described above.

Hereinafter, the present invention will be explained in further detail with reference to the accompanying drawings showing the Examples thereof.

EXAMPLES

Example 1

As an Example of the present invention, samples of the hydrogen-absorbing alloys were produced in the following way. The samples of this Examples were all about 20 g ingots obtained by arc melting under an argon atmosphere by using a water-cooled copper hearth. Each of the as-cast ingots was pulverized in air and was subjected to the activation treatment comprising four cycles of evacuation at 10 to 4 torr and hydrogen pressurization at 50 atm at a temperature of 500° C., and the hydrogen storage amount of each alloy and its hydrogen desorption characteristics were measured by the vacuum origin method stipulated by the pressure composition isotherm measurement method by a volumetric method (JIS H7210). Observation by the transmission electron microscope was made by preparing a thin film from each bulk sample by ion milling.

The structural analysis of each alloy was conducted by using a transmission electron microscope and its accessorial EDX (energy dispersive X-ray spectrometer). Further, each crystal structural model was produced on the basis of the information obtained by the transmission electron microscope, and Rietveld analysis of powder X-ray diffraction data was conducted. Unlike ordinary X-ray diffraction methods, the Rietveld analysis can refine the crystal structure parameters more precisely by using the diffraction intensity and can provide the weight fraction of each phase by calculation. The software "RIETAN-94", developed by Dr. Izumi of National Institute for Research in Inorganic Materials, was used for the Rietveld analysis. Though the Rietveld analysis can obtain an average phase fraction and crystal structural parameters with high precision, a crystal structure model having a very high probability is necessary for this analysis. The combination of these two means will presumably provide a powerful key for the development of materials by a novel structural control in the nano-scale as together they hide their demerits.

Figure 7:
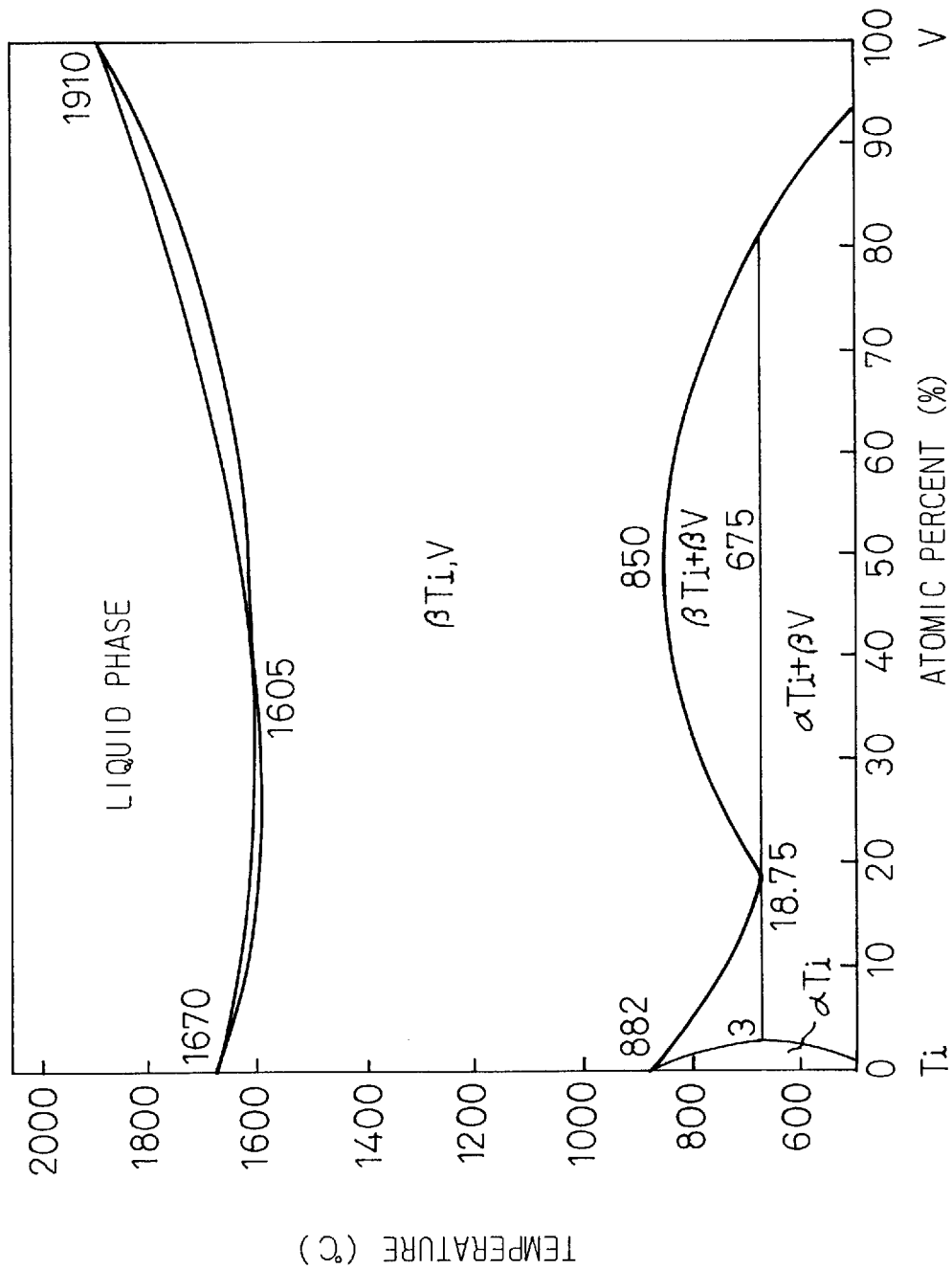
FIG. 7 is a phase diagram of the Ti—V alloy according to Example 1 of the present invention.

In this Example, the Ti—V alloy systems were produced by the production method described above and were measured by the measurement method described above. FIG. 7 shows the phase diagram of the alloys of this Example. In this phase diagram, this system makes homogeneous solid solution of the $\beta$Ti, V in any atomic ratio, i.e. a solubility limit exists within the range of 18.75 at % to 80 at % of V at a temperature not higher than 850° C., and the solid solution comprises $\beta$Ti+$\beta$V within the range of 850 to 675° C. The spinodal decomposition occurred at the periphery of this range. By the way, since the phase diagram represents the phase at the time of equilibrium, the formation range somewhat expands at the time of quenching. In other words, this condition is coincident with the stipulation of claim 1 of the present invention, that is, the free energy vs. composition curve of the solid solution is upwardly convexed at a temperature not lower than the solidus line in the phase diagram, i.e. $d^2G/dX_B^2 < 0$ (where G is chemical free energy and $X_B$ is a solute concentration and the solute is hereby V). The alloy system typically exhibits the spinodal decomposition.

Figure 6:
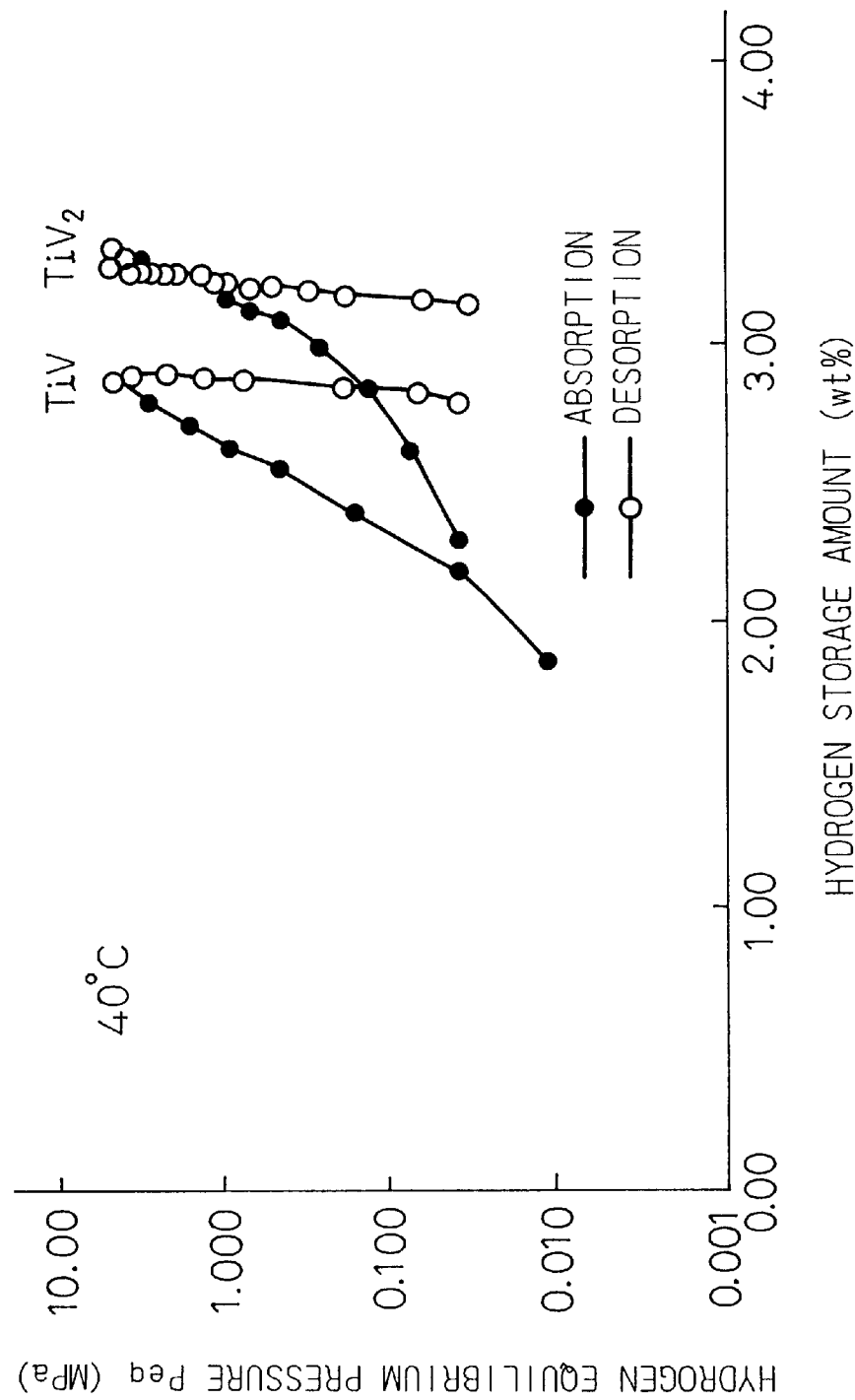
FIG. 6 is a diagram showing hydrogen absorption and desorption characteristics of the Ti—V alloy at 40° C. according to Example 1 of the present invention.

FIG. 6 shows a pressure vs. composition isothermal line of TiV and TiV$_2$ of the prior art in the present alloy system. Each curve represents the hydrogen absorption and desorption processes at 40° C.

It can be appreciated from FIG. 6 that the $Ti_{1.0}V_{1.0}$ alloy and the $Ti_{1.0}V_{2.0}$ alloy of the present invention have a large hydrogen storage capacity, but they hardly desorb hydrogen.

The separation of the two phases can be confirmed by the lamella size of about 10 nm, by observation by transmission electron microscope, but the structure has not yet grown as great as the modulated structure. It can be assumed, however, that the hydrogen desorption characteristics can be remarkably improved by executing the structure control due to the heat-treatment. In other words, though the spinodal structure can be observed for these alloys, the structure is not yet regularized and as a result, the alloys only absorb and store hydrogen but hardly desorb it. Moreover, since the alloys have the fine structure formed by the spinodal decomposition, excellent hydrogen desorption characteristics can be obtained by growing the structure and regularizing it by the heat-treatment in these alloy components.

As described in claim 7 of the present invention, this heat-treatment comprising a solution treatment which holds the alloy at a temperature of 500 to 1,500° C. for 1 minute to 50 hours and then quenches it, and an aging treatment which holds the alloy at 250 to 1,000° C. for 1 minute to 100 hours.

Example 2

Figure 4:
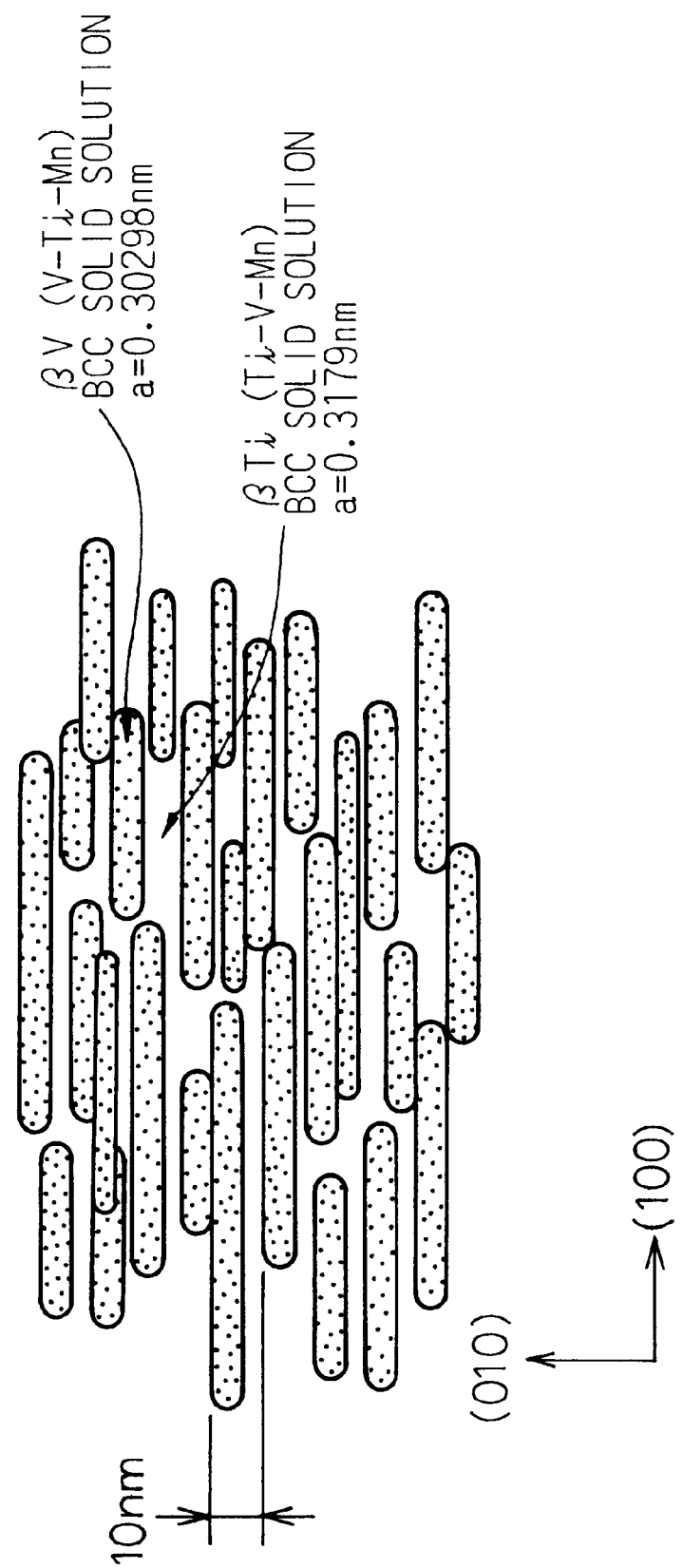
FIG. 4 is a view showing a model of a fine structure of the Ti—Mn—V system according to Example 2 of the present invention.

The Ti—V—Mn alloy systems of this Example will be explained. In this Example, the production method and the measurement method of the alloys were the same as those of Example 1. In this alloy system, the PCT (pressure composition isotherm) measurement was carried out for the two components of the substantially BCC single-phase components. FIG. 5 shows the transmission electron micrograph of the $Ti_{1.0}Mn_{0.9}V_{1.1}$ alloy. It can be seen from this photograph that the modulated structure grew and that am-clear lamella structure about 20 nm in its size across exists. FIG. 4 shows the model of this structure. In this drawing, the $\beta$Ti solid solution and the $\beta$V solid solution exhibited, substantially equidistantly, the regular periodical structures in the lamella form, and the lamella size was 10 nm, by way of example. FIG. 1 shows the hydrogen desorption process of the $Ti_{1.0}Mn_{1.0}V_{1.0}$ alloy of the present system at temperatures of 0, 40, 100 and 200° C.

Figure 2:
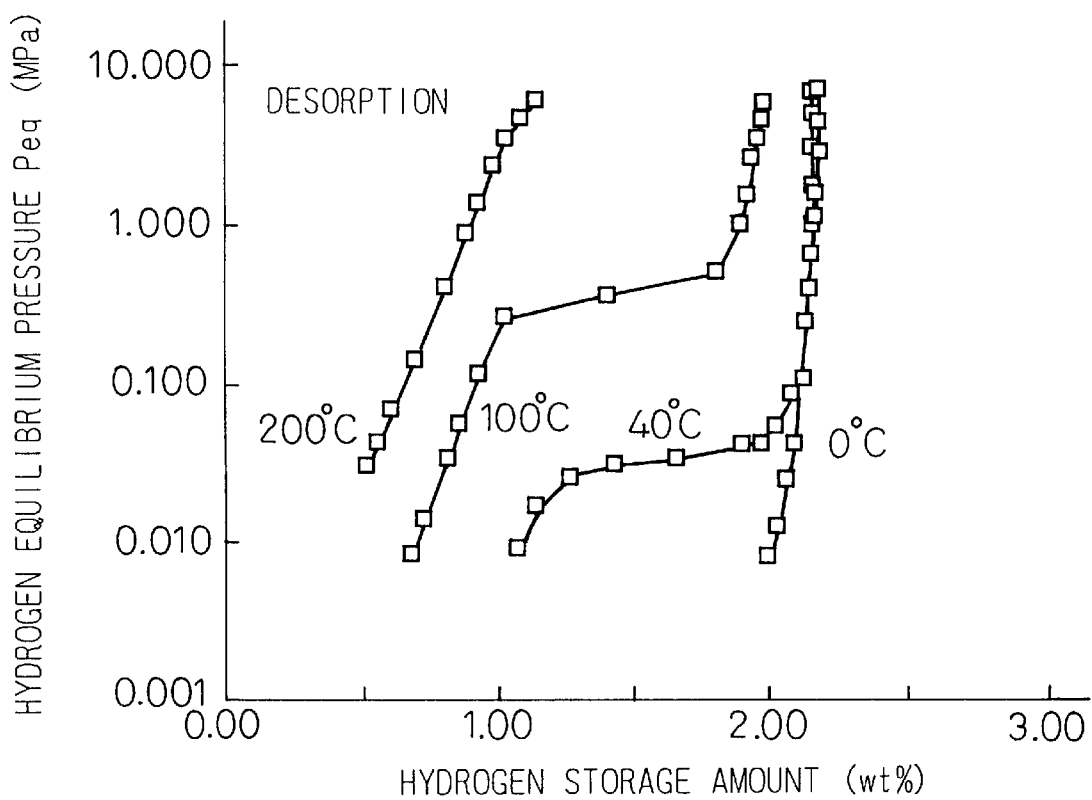
FIG. 2 is a diagram showing the pressure-composition isotherm at desorption of a $Ti_{0.9}Mn_{1.0}V_{1.1}$ alloy according to Example 2 of the present invention at each temperature.
Figure 3:
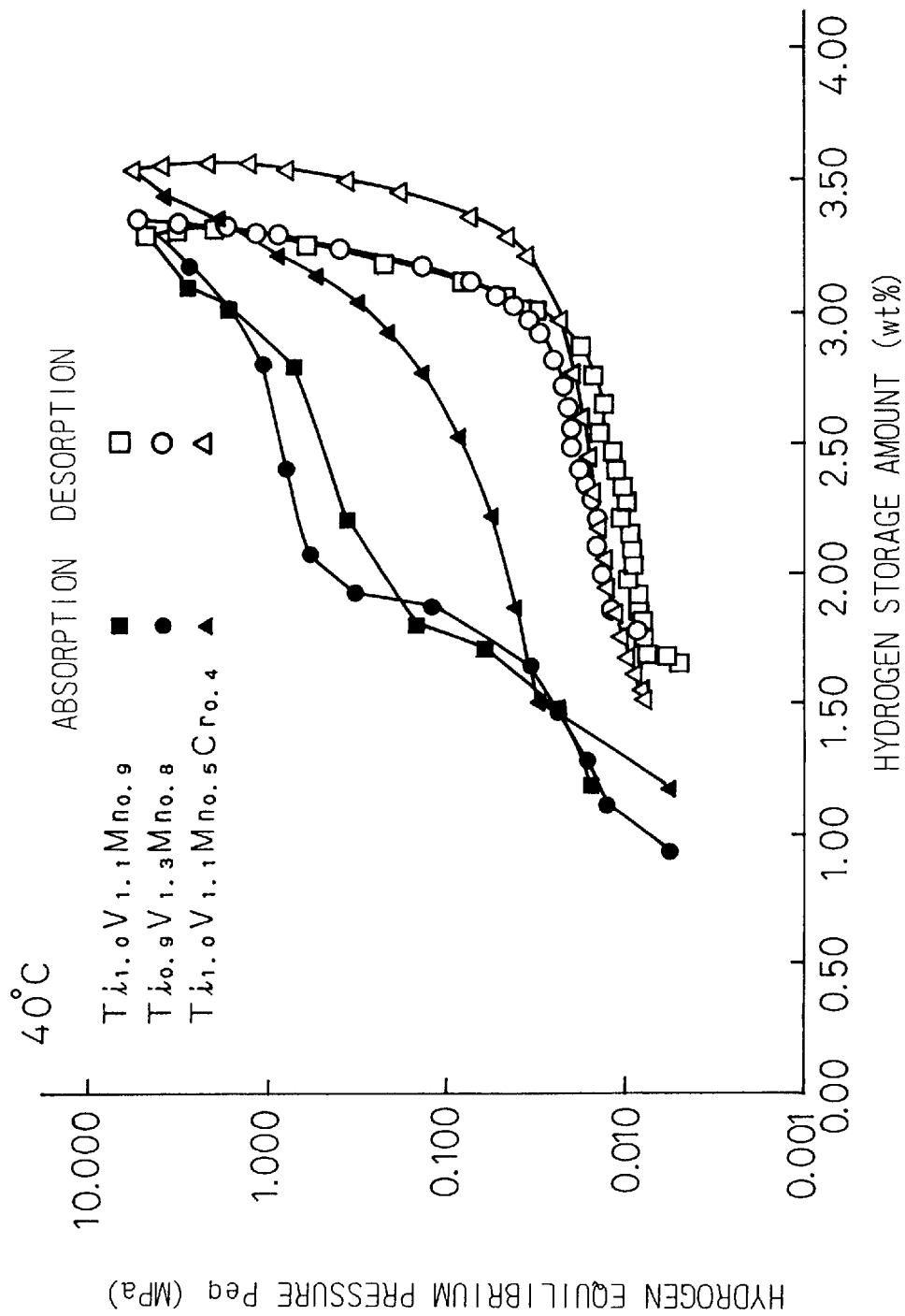
FIG. 3 is a diagram showing pressure-composition isotherm at absorption and desorption of Ti—Mn—V and Ti—Mn—V—C systems at 40° C. according to Examples 2 and 3 of the present invention.

FIG. 2 similarly shows the hydrogen desorption process of the $Ti_{0.9}Mn_{1.0}V_{1.1}$ alloy. Further, FIG. 3 shows the hydrogen absorption and desorption processes of the $Ti_{1.0}Mn_{0.9}V_{1.1}$ alloy at 40° C.

It can be appreciated from these drawings that the present material ($Ti_{1.0}Mn_{0.9}V_{1.1}$ alloy) having therein the regularized modulated structure had a large hydrogen desorption amount. The improvement in the hydrogen desorption amount in the normal temperature zone is the greatest effect brought forth by the present invention. In the alloy according to the present invention, the plateau region of the equilibrium pressure of the desorption could be improved to at least 1 atm by raising the temperature to 100° C. This plateau region was extremely flat, and was advantageous for practical application.

In the case of the alloy ($Ti_{0.9}Mn_{1.0}V_{1.1}$) having only the two-phase separation in the same way as Ti—V and a low degree of regularization, on the contrary, both the hydrogen absorption and desorption amount dropped to the half. Nevertheless, these values exhibited a greater improvement in comparison with the Ti—V alloy.

The components of the two alloys described above were determined on the basis of the finding that in the structure observation of the $Ti_{1.0}V_{1.0}Mn_{1.0}$ alloy, the components were $Ti_{1.0}Mn_{0.9}V_{1.1}$ and the grown and modulated structure could be recognized in the BCC phase ($Ti_{0.9}Mn_{1.0}V_{1.1}$) of the matrix and in the proximity of the interface of the C14 phase that crystallized in the colony form. In other words, the colony-like crystallized product was observed in the as-cast samples of the $Ti_{1.0}Mn_{1.0}V_{1.0}$ alloy, the structure was found to have the matrix comprising the BCC structure and the colony comprising the C14 (Laves phase) structure as a result of the observation through the transmission electron microscope, and the weight fractions were 78 wt % and 22 wt % as a result of the X-ray Rietveld analysis. Further, as a result of the composition of each phase by the EDX, it was found out that each phase contained all of the three elements of Ti, Mn and V and a slight change of the components caused a great change of the crystal structure. It was discovered from this fact that a novel phase such as the phase of this Example having a fine structure of the nano-order existed in the proximity of the interface of the constituent phases of the $Ti_{1.0}Mn_{1.0}V_{1.0}$ alloy.

Example 3

The Ti—V—Mn—Cr alloy systems of this Example will be explained. The production method and the measurement method of the alloys of this Example were the same as those of Example 1.

The design of the alloy of this Example was made by replacing a part of Mn of Example 2 by Cr, and its composition was $Ti_{1.0}V_{1.1}Mn_{0.5}Cr_{0.4}$. This alloy, too, exhibited excellent desorption characteristics as shown in FIG. 3. The internal structure of this alloy was substantially the same as that of $Ti_{1.0}Mn_{0.9}V_{1.1}$. However, because the lattice constant of each phase somewhat changed, the degree of instability of the hydrides became somewhat greater.

Example 4

The Zr—Ti—Mn—V alloy systems of this Example will be explained. The production method and the measurement method of the alloy of this Example were the same as those of Example 1.

In the quaternary system of this Example, the $AB_2$ (C14 Laves phase, C15[$MgCu_2$ type] Laves phase) phase having relatively good absorption and desorption characteristics and the BCC phase having a large capacity exist in the mixture. It became possible to simulate the volume of the alloy by the composite rule of the volume assumed on the basis of the structure of the hydride of each single-phase on the $Zr_xTi_{1-x}MnV$ line of this single-phase region and the weight fraction determined by the X-ray diffraction. As a result, the calculation value of the volume increased due to the increase of the fraction of the BCC phase resulting from the increase of the amount of Ti. From this result, the alloy system of this Example rendered the fundamental basis for the shift to the alloy design using Ti as the principal component as in the foregoing Examples 1 to 3.

Hereinafter, activation as a common technical item for each of Examples will be explained.

The pressure-composition isotherm measurement shown in FIGS. 1 to 3 and 6 is generally carried out after absorption and desorption of hydrogen are repeated three to five times as the activating treatment. In the cases of V and the Ti—V alloy, the activating treatment requires an extremely severe condition such as absorption of hydrogen at a high pressure of about 5 MPa, desorption of hydrogen at a vacuum of 10 to 40 Torr and a high temperature of about 500° C. and, in some cases, the above with combination with mechanical pulverization in a clean atmosphere such as inside a globe box. In contrast, in the alloys having the regularized spinodal structure according to the present invention such as the heat-treated materials of the Ti—V—Mn alloy, the Ti—V—Mn—Cr alloy and the Ti—V alloy, activation can be carried out under the condition which is not so severe, as tabulated in Table 1.

TABLE 1

|  | No. | component | vacuum exhaust temperature | hydrogen application pressure | mechanical pulverization after hydrogen application |
|---|---|---|---|---|---|
| material of this invention | 1 | $Ti_{0.1}V_{1.1}Mn_{0.9}$ | 350° C. | 1.0 MPa | not necessary |
|  | 2 | $Ti_{0.9}V_{1.1}Mn_{1.0}$ | 450° C. | 1.0 MPa | not necessary |
|  | 3 | $Ti_{0.9}V_{1.3}Mn_{0.8}$ | 350° C. | 1.0 MPa | notnecessary |
|  | 4 | $Ti_{1.0}V_{1.1}Mn_{0.5}Cr_{0.4}$ | 300° C. | 1.0 MPa | not necessary |
| prior art material | 5 | V | 500° C. | 5.0 MPa | necessary |
|  | 6 | $Ti_{1.0}V_{1.0}$ | 500° C. | 5.0 MPa | necessary |
|  | 7 | $Ti_{1.0}V_{2.0}$ | 500° C. | 5.0 MPa | necessary |

In the BCC alloys according to the prior art, there was the common problem that the reaction rate was extremely low in each of the hydrogen absorption and desorption processes. In contrast, in the materials of the present invention wherein the internal structure was regularized, the reaction rate was about 10 to 500 times higher than that of V and Ti—V according to the prior art.

As can be understood from Examples given above, the reasons why the reaction rate is low, activation is difficult and the hydrogen desorption characteristics are inferior under the practical condition in the BCC alloys according to the prior art are presumably as follows:

(1) diffusion of the hydrogen atoms inside the BCC lattice is slow;

(2) unlike the $AB_5$ type and the $AB_2$ type, the BCC type is not converted to fine powder by hydrogeneration;

(3) the resulting hydrides exist stably. However, as represented by Examples, the interface generated by the two phases formed in the nano-order accelerates the diffusion of the hydrogen atoms inside the alloy, as a high speed diffusion path, and this results in the improvement in the reaction rate and in ease of activation. It is believed that stability of the hydrides drops due to the coherent strain between the two phases in the proximity of the interface, and this presumably results in the improvement in the hydrogen desorption characteristics. The present invention can remarkably improve the hydrogen desorption characteristics of the BCC alloy by these synergistic effects.

In the present invention, fineness of the two phases formed inside the alloy is of the greatest importance. As described already, several attempts have been made to improve the hydrogen absorption and desorption characteristics by the multi-phase, but they are all two-phase mixing of the micron order.

Since the second phase dispersed in the micron order can serve as the starting point of cracks at the time of pulverization, the effects for the reaction rate in the absorption and desorption processes and for the mitigation of the activation condition, in particular, may be conceivable. On the contrary, attempts have also been made to prevent pulverization and to improve durability by the second phase having ductility. According to two-phase mixing in the micron order, however, the effect as the diffusion path and the effect of the lattice strain in the proximity of the interface cannot be expected as a whole bulk because the density of the interface is small. When the two phases are dispersed of the nano-order scale and the interface between the two phases is oriented as the specific crystal orientation with keeping coherency, however, the density of the interface and that of the influence region of the coherent strain are believed to provide a sufficient effect.

Recent studies report that the nano-order structure can be formed by thin film technology such as sputtering and vacuum deposition, and the film so formed has the hydrogen absorption and desorption characteristics. Unlike the method of the present invention which employs the phase transformation, these production methods can improve the interface density, it is true, but require separate heat-treatment, etc., in order to stabilize the coherent strain and the orientation relation in the proximity of the interface. In other words, since such a structure artificially synthesized is inferior in the aspect of stability to the structure which is naturally formed by a simple process of casting-solidification, stable hydrides can be formed easily, and even when a large absorption and desorption capacity can be obtained, it is difficult to expect excellent hydrogen desorption characteristics. Above all things, such a process is not suitable for industrial materials for mass-production because the production condition and equipment are complicated.

As to the effect of preventing fine pulverization, this performance is likely to drop in the course of repetition of absorption and desorption of hydrogen in the $AB_5$ type and $AB_2$ type alloys, and this results in the drop of durability in a practical application. One of the causes may be an increase of the surface area with pulverization of the alloy and its poisoning by impurity gases other than hydrogen. Most of the intermetallic compounds have the structure which cannot easily mitigate the strain due to penetration of hydrogen by their nature, and when multiple phases exist in the micron order as a mixture, this misfit interface serves as the starting points of cracks due to accumulation of strains and promotes pulverization in some cases.

In contrast, since the two phases are dispersed uniformly in the structure according to the present invention, the strain is not localized, and since the interface is a coherent interface, it does not serve as the starting point of cracks. As a result, pulverization is not likely to occur, and the grain diameter of the $Ti_{1.0}V_{1.1}Mn_{0.9}$ alloy is more than 20 times the grain diameter of the $AB_2$ single-phase alloy of $Ti_{1.2}V_{0.6}Mn_{1.0}$ alloy having similar compositions. This property would remarkably improve the durability.

The hydrogen-absorbing alloy according to the present invention functions as the high speed diffusion path for hydrogen by the interface of its two nano-order phases, improves mobility of the hydrogen atoms inside the metal, promotes the reaction rate of the hydrides, and can simplify the activation process as the pre-treatment because stability of the hydrides drops due to the coherent strain between the two phases, and this results particularly in the improvement in the hydrogen desorption characteristics. The present invention is based on the premise that the spinodal phase exists as the principal phase, and is expected to contribute to the development in the hydrogen-absorbing alloys in future. Further, the measurement method according to the present invention can improve efficiency of the measurement and has great significance as a method of evaluating alloys.

What is claimed is:

1. A hydrogen-absorbing alloy comprising at least two alloying elements, said alloy having as a principal phase thereof a spinodal structure comprising two body centered cubic crystal structure solid solution phases with a lamella spacing 1.0 to 100 nm, wherein in a free energy versus composition diagram of said alloying elements the chemical free energy curve corresponding to said alloy has a shape describing an upwardly convex curve at a temperature not higher than a solidus line in a phase diagram for said alloying elements or a region satisfying $d^2G/dX_B^2<0$; where G in said alloy is chemical free energy of a solute element and $X_B$ is concentration of said solute element.

2. A hydrogen-absorbing alloy comprising as a principal phase thereof a spinodal structure produced by a melting-solidification process or in a solution-aging process, and composed of two body centered cubic crystal structure solid solution phases with a lamella spacing in nano-order of 1.0 to 100 nm.

3. A hydrogen-absorbing alloy according to claim 1, wherein said composition is expressed by the general formula $Ti_xV_{2-x}$; where x satisfies the relation $0.5 \leq x \leq 1.5$.

4. A hydrogen-absorbing alloy according to claim 1, wherein said composition is expressed by the general formula $Ti_xV_yMn_z$; where each of x, y, and z satisfies the relation $0.1 \leq x \leq 2.5$, $0.1 \leq y \leq 2.7$, $0.01 \leq z \leq 2.5$ and $x+y+z=3.0$.

5. A hydrogen-absorbing alloy according to claim 1, wherein said composition is expressed by the general formula $Ti_xV_yMn_zCr_{1-z}$; where each of x, y, and z satisfies the relation $0.1 \leq x \leq 2.5$, $0.1 \leq y \leq 2.7$, $0.01 \leq z \leq 2.5$ and $x+y+z=3.0$.

6. A hydrogen-absorbing alloy according to claim 1, wherein the spinodal structure is attained by solution treatment at 500 to 1,500° C. for 1 minute to 50 hours and, optionally, an aging treatment at 250 to 1,000° C. for 1 minute to 100 hours.

7. A hydrogen-absorbing alloy according to claim 2, wherein said composition is expressed by the general formula $Ti_xV_{2-x}$; where x satisfies the relation $0.5 \leq x \leq 1.5$.

8. A hydrogen-absorbing alloy according to claim 2, wherein said composition is expressed by the general formula $Ti_xV_yMn_z$; where each of x, y and z satisfies the relation $0.1 \leq x \leq 2.5$, $0.1 \leq y \leq 2.7$, $0.01 \leq z \leq 2.5$ and $x+y+z=3.0$.

9. A hydrogen-absorbing alloy according to claim 2, wherein said composition is expressed by the general formula $Ti_xV_yMn_zCr_{1-z}$; where each of x, y and z satisfies the relation $0.1 \leq x \leq 2.5$, $0,1 \leq y \leq 2.7$, $0.01 \leq z \leq 2.5$ and $x+y+z= 3.0$.

10. A hydrogen-absorbing alloy according to claim 2, wherein the spinodal structure is attained by solution treatment at 500 to 1,500° C. for 1 minute to 50 hours and, optionally, an aging treatment at 250 to 1,000° C. for 1 minute to 100 hours.

* * * * *